(12) United States Patent
de Andrade Filho et al.

(10) Patent No.: US 8,141,248 B2
(45) Date of Patent: Mar. 27, 2012

(54) METHOD OF MAKING A PUMP

(75) Inventors: Ayres Pinto de Andrade Filho, São Paulo (BR); Robson Luiz Rezende, São Paulo (BR); Edgard Ferraz, São Paulo (BR); Joao Luiz de Carvalho Meira, São Paulo (BR)

(73) Assignee: Melling Do Brasil Componentes Automotivos Ltda., Sao Paulo (BR)

( * ) Notice: Subject to any disclaimer, the term of this patent is extended or adjusted under 35 U.S.C. 154(b) by 1269 days.

(21) Appl. No.: 10/549,536

(22) PCT Filed: Mar. 16, 2004

(86) PCT No.: PCT/IB2004/000875
§ 371 (c)(1),
(2), (4) Date: Sep. 25, 2007

(87) PCT Pub. No.: WO2004/082919
PCT Pub. Date: Sep. 30, 2004

(65) Prior Publication Data
US 2008/0040923 A1    Feb. 21, 2008

(30) Foreign Application Priority Data
Mar. 19, 2003  (GB) .................................. 0306238.7

(51) Int. Cl.
*B23P 15/00*    (2006.01)
(52) U.S. Cl. .................. 29/888.02; 29/888; 29/888.024; 310/43; 310/67 R; 310/89; 310/90; 384/296; 415/55.1; 415/229

(58) Field of Classification Search .................... 29/888, 29/888.02, 888.022–888.025; 310/43, 89, 310/90, 67 R; 384/295, 296; 415/55.1, 229
See application file for complete search history.

(56) References Cited

U.S. PATENT DOCUMENTS

| 4,543,228 | A | | 9/1985 | Bingler |
| 4,580,757 | A | | 4/1986 | Dobhan et al. |
| 4,663,938 | A | * | 5/1987 | Colgate ........................... 60/620 |
| 4,715,780 | A | | 12/1987 | Kan |
| 4,746,270 | A | * | 5/1988 | Hale et al. ..................... 415/230 |
| 4,827,589 | A | | 5/1989 | Friedrichs |
| 5,770,907 | A | * | 6/1998 | Danish et al. ................... 310/90 |

(Continued)

FOREIGN PATENT DOCUMENTS

DE        42 14 752        11/1993
(Continued)

OTHER PUBLICATIONS

English Language Abstract of JP 10-103289 from European Patent Office, (Apr. 21, 1998).

(Continued)

*Primary Examiner* — Richard Chang
(74) *Attorney, Agent, or Firm* — Young Basile Hanlon & MacFarlane P.C.

(57) ABSTRACT

A method of making a pump (10) including a polymeric pump housing (12) and a drive shaft (14) mounted for rotation in a bearing (16), the bearing (16) having on an exterior surface at least one engagement formation (44), —the method including the step of molding the pump housing (12) around the bearing (16) such that the housing (12) co-operates with the engagement formation (44) to restrict movement of the bearing (16) with respect to the housing (12).

8 Claims, 1 Drawing Sheet

U.S. PATENT DOCUMENTS

Figure 1:
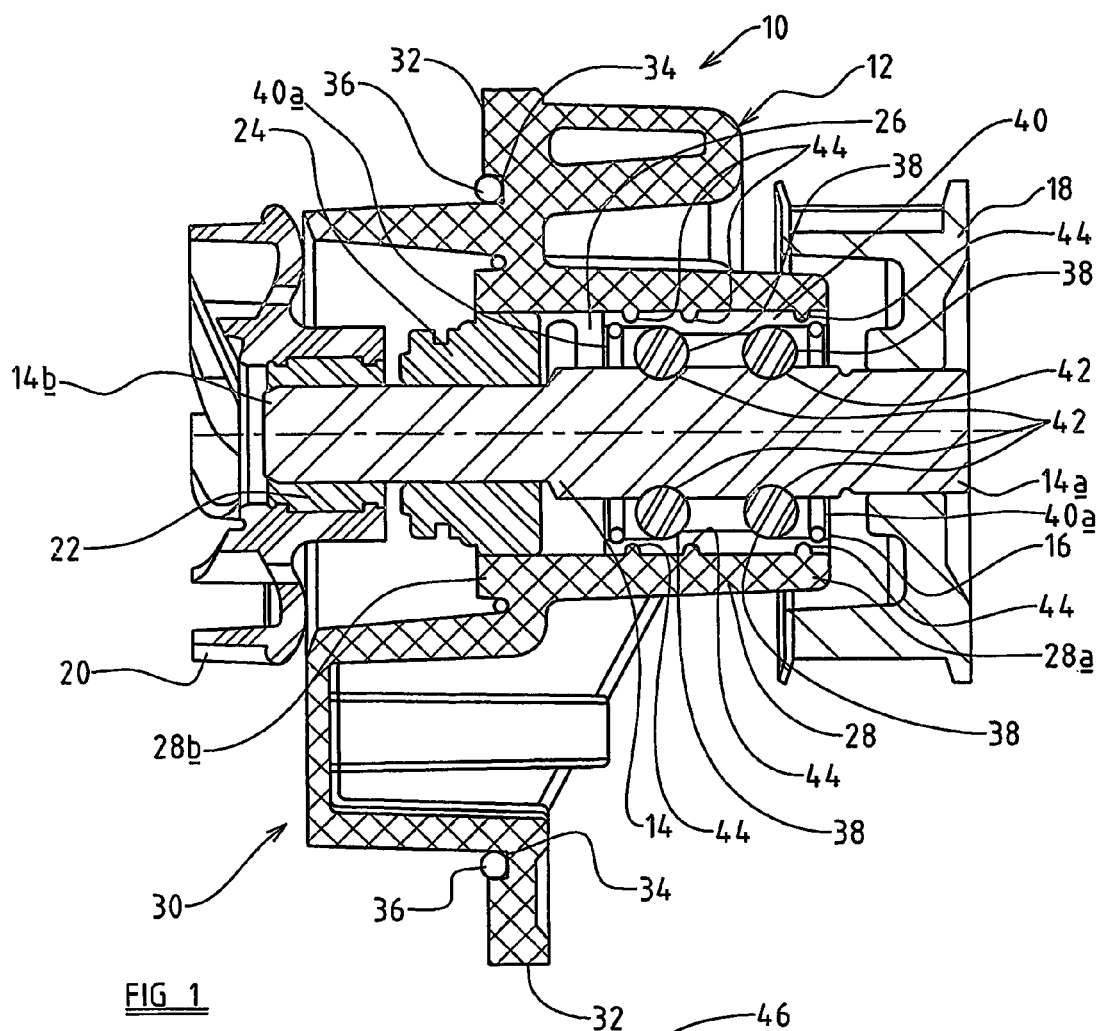

| | | | |
|---|---|---|---|
| 6,142,675 | A | 11/2000 | Brandenstein et al. |
| 6,302,650 | B1 | 10/2001 | Williams et al. |
| 6,343,915 | B2 | 2/2002 | Williams et al. |
| 7,804,213 | B2 * | 9/2010 | Hoffman et al. ............ 310/90 |

FOREIGN PATENT DOCUMENTS

| | | |
|---|---|---|
| DE | 195 42 914 | 6/1996 |
| JP | 10-103289 | 4/1998 |
| JP | 2003-065424 | 3/2003 |
| WO | WO 96/18820 | 6/1996 |

OTHER PUBLICATIONS

English Language Abstract of JP 2003-065424 from European Patent Office, (May 3, 2003).

International Search Report Issued in Priority Application PCT/IB2004/000875 (Jul. 22, 2004).

Search Report Issued in Priority Application GB 0306238.7 (Oct. 29, 2003).

* cited by examiner

US 8,141,248 B2

METHOD OF MAKING A PUMP

This application is the national stage application of, and claims priority to, International Application No. PCT/IB2004/000875 filed Mar. 16, 2004, the entire disclosure of which is incorporated herein by reference. The International Application was published in the English language on Sep. 30, 2004 as International Publication No. WO 2004/082919 and itself claims the benefit of United Kingdom Patent Application No. 0306238.7 filed Mar. 19, 2003, the entire disclosure of which is incorporated herein by reference.

DESCRIPTION OF INVENTION

The present invention relates to a method of making a pump.

Conventionally, the housing for a pump such as a water pump for use in automotive applications is moulded from aluminum. A bearing for a drive shaft of the pump is mounted in an aperture in the housing, and it is necessary to achieve a good fit between the bearing and the housing to ensure that the movement of the bearing with respect to the housing is substantially prevented. It is therefore necessary to machine the housing after moulding to ensure that the aperture is of the correct dimensions to receive the bearing.

According to a first aspect of the invention, we provide a method of making a pump including a polymeric pump housing and a drive shaft mounted for rotation in a bearing, the bearing having on an exterior surface at least one engagement formation, the method including the step of moulding the pump housing around the bearing such that the housing co-operates with the engagement formation to restrict movement of the bearing with respect to the housing.

Thus, by virtue of the invention, it is not necessary for the housing to be machined after moulding, or the bearing to be fitted in a separate stage, and therefore the complexity, and hence cost, of manufacturing the pump is reduced. Moreover, as machined parts are subject to some dimensional variation, rigid engagement between the bearing and housing is easier to achieve and the results are more reproducible when the method of the first aspect of the invention is used.

Preferably, the housing is made from a thermoplastic polymer.

Preferably, the housing is moulded using injection moulding.

Preferably, a lubricant is incorporated in the bearing prior to moulding of the housing around the bearing.

As the temperature of a polymer during moulding is relatively low compared to the temperature of aluminum, a conventional low-temperature lubricant or grease to assist in smooth and low friction rotation of the drive shaft in the bearing can be incorporated in the bearing prior to moulding of the housing around the bearing without there being significant degradation of the lubricant during the moulding process.

Preferably, the exterior surface of the bearing is generally cylindrical, and the engagement formation comprises at least one circumferential groove in the exterior surface of the bearing.

Preferably, the shaft is received in a use position in the bearing during moulding of the housing.

The bearing may be a ball bearing.

According to a second aspect of the invention, we provide a pump made using the method of the first aspect of the invention.

The pump may be a coolant pump for an automotive engine.

Figure 2:
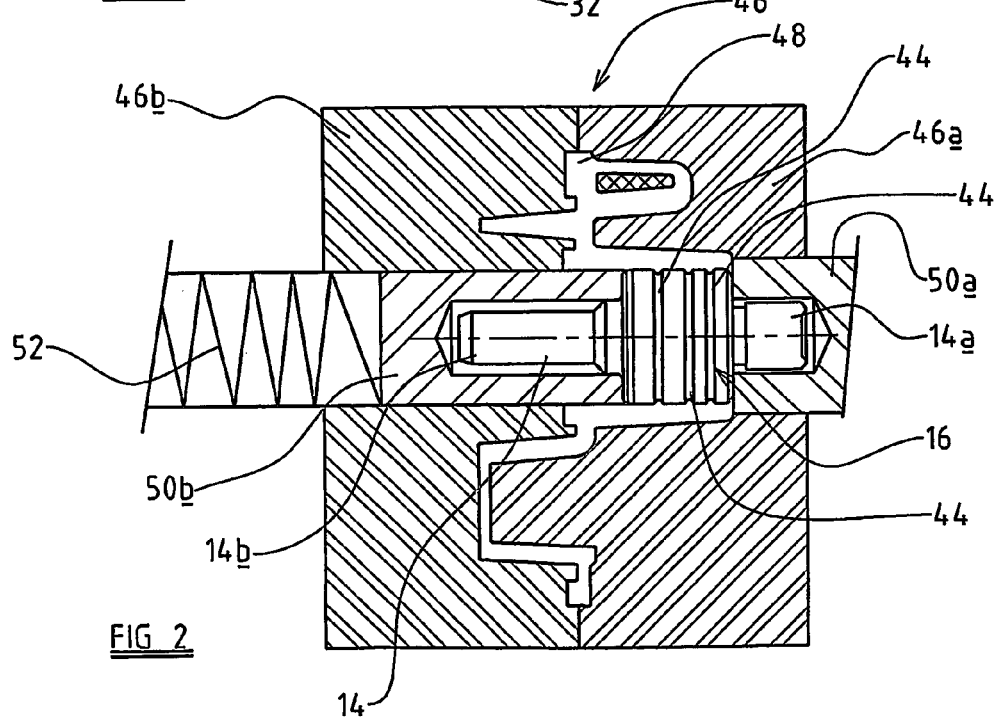

An embodiment of the invention will now be described by way of example only in the accompanying drawings of which, FIG. 1 is an illustration of a cross-section through a pump according to the second aspect of the invention, FIG. 2 is an illustration of a cross-section through a mould for making a pump housing according to the method of the first aspect of the invention.

Referring now to FIG. 1, there is shown a water pump 10 for use in a cooling system of an automotive engine, the pump including a polymeric pump housing 12 and a generally cylindrical drive shaft 14 mounted for rotation in a bearing 16, first 14a and second 14b ends of the drive shaft 14 extending beyond the housing 12. A toothed pulley 18 is mounted on the first end 14a of the drive shaft 14, and in use this is connected to a crankshaft of the engine by means of a toothed belt such that rotation of the crankshaft causes rotation of the drive shaft 14 about a longitudinal axis A of the shaft 14. An impeller 20 is mounted on the second end 14b of the drive shaft 14 by means of a locking ring 22.

The bearing 16 is mounted in a generally cylindrical aperture 26 in the housing 12, the aperture 26 being surrounded by a side wall 28 which extends generally parallel to the longitudinal axis A of the drive shaft 14 from a first end 28a adjacent the pulley 18 to a second end 28b adjacent the impeller 20. The housing 12 further includes a flange portion 30 which extends from the second end 28b of the side wall 28. The flange portion 30 includes an annular sealing lip 32 which extends radially outwardly of the side wall 28 generally perpendicular to the axis A and which includes a circular groove 34 around the entire extent of the sealing lip 32. A sealing device, in this case an O-ring 36, is contained in the groove 34.

In use in an automotive engine, the pump housing 12 is mounted on an exterior surface of a cooling jacket surrounding the engine, with the second end 14b of the drive shaft 14 extending through an aperture provided in the cooling jacket into the cooling jacket, and the first end 14a of the drive shaft 14 and pulley 18 remaining outside the cooling jacket. The sealing lip 32 engages with the exterior surface of the cooling jacket, and the O-ring 36 thus provides a substantially fluid tight seal between the housing 12 and the cooling jacket. Thus the impeller 20 is located within the cooling jacket, and rotation of the drive shaft 14 results in pumping of water, or any other cooling fluid, around the cooling jacket.

In order to prevent fluid contained in the cooling jacket from leaking out of the cooling jacket via the bearing receiving aperture 26, a conventional mechanical sealing part 24 is mounted around the drive shaft 14 between the bearing 16 and the impeller 20, and provides a substantially fluid tight seal between the drive shaft 14 and the side wall 28.

In this example, the bearing 16 is a metallic ball bearing, and includes two sets of bearing balls 38 mounted in a generally cylindrical race 40. The race 40 is provided with a radially inwardly extending retaining flange 40a at both of its free ends. Two ball locating grooves 42 are provided around the circumference of the drive shaft 14, and a first set of bearing balls 38 are located in the first groove 42a, and a second set of bearing balls 38 are located in the second groove 42b, the engagement of the bearing balls 38 and the grooves 42 thus preventing the drive shaft 14 from moving in a direction generally parallel to its longitudinal axis A when located in the bearing 16.

An exterior surface of the race 40 is provided with at least one engagement formation 44, and in this example, the engagement formation 44 is a circumferential groove, and three of such engagement grooves 44 are provided around the exterior surface of the race 40. The function of the engagement grooves 44 will be discussed further below.

The pump 10 is manufactured as follows.

The pump housing 12 is moulded from a polymer which is preferably a thermoplastic polymer such as polypthalamide, polyphenylene sulfide, or polyamide, in this example by injection moulding, using a mould 46 as illustrated in FIG. 2. A thermoplastic polymer is preferably used rather than a thermoset polymer such as a phenolic resin, because thermoplastic polymers are more suitable for use in injection moulding, and are more readily recycled and re-used.

The mould 46 includes a first part 46a and a second part 46b which are shaped such that together they form a mould cavity 48 of the required shape to form the housing 12.

The pump housing 12 is moulded around the bearing 16 with the drive shaft 14 in place within the bearing 16 such that the housing 12 cooperates with the engagement grooves 44 substantially to prevent movement of the bearing 16 with respect to the housing 12. Thus, first and second inserts 50a, 50b are provided to hold the drive shaft 14 and bearing 16 in place in the mould cavity 48 during moulding of the housing 12.

The first insert 50a extends through an aperture provided in the first mould part 46a to an edge of the mould cavity 48 which forms the first end 28a of the side wall 28, the first mould part 46a fitting sufficiently tightly around the first insert 50a substantially to prevent molten polymer from leaking out of the mould cavity 48 around the first insert 50a whilst still permitting movement of the first insert 50a in and out of the first mould part 46a. The first insert 50a includes a recess in which the first end 14a of the drive shaft 14 is supported.

The second insert 50b extends through an aperture provided in the second mould part 46b into the mould cavity 48 generally centrally of the part of the mould cavity that forms the second end 28b of the side wall 28 and towards the part of the cavity that forms the first end 28a of the side wall 28. Thus, the second insert 50b assists in forming the interior surface of the second end 28b of the side wall 28. The second mould part 46b fits sufficiently tightly around the second insert 50b substantially to prevent molten polymer from leaking out of the mould cavity 48 around the second insert 50b whilst still permitting movement of the second insert 50b in and out of the second mould part 46b and includes a recess in which the second end 14b of the drive shaft 14 is supported.

Both the first 50a and second 50b inserts butt up against the bearing 16 such that molten polymer can only flow around the exterior surface of the bearing race 40 and cannot contact the drive shaft 14 or the retaining flanges 40a of the bearing 16.

The first insert 50a is located against a support structure which is fixed relative to the mould 46, whilst a resilient biasing means 52, in this example a helical spring, is provided to urge the second insert 50b into the mould cavity 48. Thus the bearing 16 is compressed between the two inserts 50a, 50b and is retained in the correct position within the mould cavity 48 during injection of molten polymer into the mould cavity 48.

Once the polymer housing 12 has cooled and set, the housing 12, drive shaft 14 and bearing 16 assembly is removed from the mould 46; the pulley 18, sealing part 24 and impeller 20 are fitted onto the drive shaft 14; and the O-ring 36 is located in the groove 34 provided in the sealing lip 32 of the housing 12. The pump 10 may then be fitted to the exterior of the cooling jacket of an engine by means of bolts (not shown) which extend through bolt receiving apertures provided in the sealing lip 32 and into the cooling jacket.

During the moulding process, molten polymer flows into the engagement grooves 44 provided around the exterior surface of the bearing race 40, and thus, once the polymer has cooled and set, the polymer within the engagement grooves 44 provides mechanical locking of the bearing 16 within the housing 12, and substantially prevents axial movement of the bearing 16 with respect to the housing 12, and may also restrict rotation of the bearing 16 with respect to the housing 12. As the housing 12 is moulded around the bearing 16, the two are locked together in a good fit without the need for machining of the housing 12 after moulding. Moreover, the need for a separate step in the pump manufacturing process for fitting of the bearing 16 and drive shaft 14 in the housing 12 is eliminated. Thus the pump manufacturing process is simplified, and hence the cost of manufacturing the pump 10 is reduced.

In addition, the moulded housing 12 is not subject to the same dimensional variations as a machined housing, and thus, a good fit between the housing 12 and the bearing 16 can be reproducibly achieved. Achieving a good fit between the housing 12 and the bearing 16 is important to minimise movement of the bearing 16 and drive shaft 14 with respect to the housing 12 during operation of the pump 10, as such movement increases the noise generated by the pump 10, increases the likelihood of pumped fluid leaking from the housing 12, and increases wear on the bearing 16. Thus, by moulding the housing 12 around the bearing 16, the life span of the bearing 16 may reliably be increased, and a relatively quiet and leak-free pump 10 may be produced.

Typically, the molten polymer reaches a maximum temperature of around 150° C. during the moulding process, a temperature which conventional low temperature lubricants can withstand without significant degradation. Thus, the bearing 16 may be lubricated using a low temperature lubricant or grease prior to the moulding process without the lubricant degrading to a significant extent during moulding.

It will be appreciated that whilst, in this example, the engagement formations are circumferential grooves 44 around the exterior surface of the bearing race 40, the engagement formations may be of any other suitable configuration to provide mechanical locking between the bearing 16 and the housing 12. The engagement formations may protrude from the exterior surface of the bearing race 40, for example in a circumferential ridge around the race 40.

Moreover, fewer or more than three engagement formations may be provided.

It is possible that where circumferentially extending engagement formations, either ridges or grooves, are used, rotation of the bearing 16 with respect to the housing 12 may still be permitted. This problem could be avoided either by providing axially extending engagement formations in addition to circumferentially extending engagement formations or by providing discontinuities in the circumferentially extending engagement formations.

The bearing 16 need not be a ball bearing. It may be a roller bearing, a combination ball and roller bearing, or any other appropriate form of bearing.

It will also be appreciated that the configuration of the housing 12 is not limited to the configuration shown in the accompanying figures, and the shape of the housing 12 could be modified to accommodate different engine configurations, and different arrangements of peripheral parts in an engine cavity.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of making a pump, the steps comprising:
   assembling a drive shaft to a bearing for rotation of said drive shaft within said bearing;
   providing at least one engagement formation on an exterior surface of said bearing;
   placing said drive shaft and said bearing into a mold, wherein a first insert and a second insert are inserted into said mold and engage both ends of said drive shaft and said bearing; and
   moulding a polymeric pump housing in said mold around and to said bearing such that said polymeric pump housing cooperates with the engagement formation to restrict movement of the bearing with respect to said polymeric pump housing and ensure proper positioning of said drive shaft relative to said bearing and said polymeric pump housing, wherein said first and second inserts position and protect said ends of said drive shaft and said bearing from said step of moulding said polymeric pump housing.

2. The method according to claim 1, wherein the polymer is a thermoplastic.

3. The method according to claim 1, wherein the housing is moulded using injection moulding.

4. The method according to claim 1, wherein a lubricant is incorporated in the bearing prior to the step of moulding a polymeric pump housing around the bearing.

5. The method according to claim 1, wherein the exterior surface of the bearing is generally cylindrical and the engagement formation comprises at least one hemi-spherical circumferential groove in the exterior surface of the bearing.

6. The method according to claim 1, wherein the bearing is a ball bearing.

7. The method according to claim 1, further comprising the steps of:
   providing a biasing means against at least one of said first and second inserts so as to bias said at least one first and second inserts against the ends of said drive shaft and said bearing.

8. The method according to claim 7, wherein said biasing means comprises a compression spring.

* * * * *